United States Patent
Hong et al.

(10) Patent No.: US 11,243,304 B2
(45) Date of Patent: *Feb. 8, 2022

(54) SYSTEMS AND METHODS FOR INTERPOLATED VIRTUAL APERATURE RADAR TRACKING

(71) Applicant: Oculii Corp., Beavercreek, OH (US)

(72) Inventors: Lang Hong, Beavercreek, OH (US); Steven Hong, Beavercreek, OH (US)

(73) Assignee: Oculii Corp., Beavercreek, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/704,409

(22) Filed: Dec. 5, 2019

(65) Prior Publication Data
US 2021/0255306 A1    Aug. 19, 2021

Related U.S. Application Data

(63) Continuation of application No. 16/503,908, filed on Jul. 5, 2019, now Pat. No. 10,564,277, which is a
(Continued)

(51) Int. Cl.
*G01S 13/72* (2006.01)
*G01S 13/90* (2006.01)
(Continued)

(52) U.S. Cl.
CPC .............. *G01S 13/723* (2013.01); *G01S 7/42* (2013.01); *G01S 13/003* (2013.01); *G01S 13/90* (2013.01);
(Continued)

(58) Field of Classification Search
CPC ............ G01S 13/84; G01S 13/87; H01Q 3/30
(Continued)

(56) References Cited

U.S. PATENT DOCUMENTS 3,978,482 A    8/1976    Williams et al.
4,246,585 A    1/1981    Mailloux
(Continued)

FOREIGN PATENT DOCUMENTS

JP    2016217976 A    12/2016
JP    2020159848 A    10/2020

OTHER PUBLICATIONS

International Search Report for PCT Application No. PCT/US18/15873 dated May 8, 2018.
(Continued)

*Primary Examiner* — Bo Fan
(74) *Attorney, Agent, or Firm* — Jeffrey Schox; Samuel Rosenthal

(57) ABSTRACT

A method for interpolated virtual aperture array radar tracking includes: transmitting first and second probe signals; receiving a first reflected probe signal at a radar array; receiving a second reflected probe signal at the radar array; calculating a target range from at least one of the first and second reflected probe signals; corresponding signal instances of the first reflected probe signal to physical receiver elements of the radar array; corresponding signal instances of the second reflected probe signal to virtual elements of the radar array; interpolating signal instances; calculating a first target angle; and calculating a position of the tracking target relative to the radar array from the target range and first target angle.

20 Claims, 18 Drawing Sheets

Related U.S. Application Data continuation-in-part of application No. 16/032,369, filed on Jul. 11, 2018, now Pat. No. 10,509,119, which is a continuation of application No. 15/883,372, filed on Jan. 30, 2018, now Pat. No. 10,048,366.

(51) Int. Cl.

| | | |
|---|---|---|
| *G01S 13/00* | (2006.01) | |
| *G01S 7/42* | (2006.01) | |
| *G01S 7/52* | (2006.01) | |
| *G01S 13/02* | (2006.01) | |
| *G01S 15/66* | (2006.01) | |
| *G01S 13/931* | (2020.01) | |
| *G01S 13/86* | (2006.01) | |
| *G01S 13/44* | (2006.01) | |
| *G01S 13/66* | (2006.01) | |

(52) U.S. Cl.
CPC ....... *G01S 7/52019* (2013.01); *G01S 7/52023* (2013.01); *G01S 13/4463* (2013.01); *G01S 13/66* (2013.01); *G01S 13/86* (2013.01); *G01S 13/931* (2013.01); *G01S 15/66* (2013.01); *G01S 2013/0263* (2013.01); *G01S 2013/932* (2020.01); *G01S 2013/9316* (2020.01); *G01S 2013/9322* (2020.01); *G01S 2013/9323* (2020.01); *G01S 2013/9324* (2020.01)

(58) Field of Classification Search
USPC .......................... 342/25 R, 59, 372, 111, 22
See application file for complete search history.

(56) References Cited

U.S. PATENT DOCUMENTS

| | | | |
|---|---|---|---|
| 4,996,532 | A | 2/1991 | Kirimoto et al. |
| 5,218,359 | A | 6/1993 | Minamisono |
| 5,278,757 | A | 1/1994 | Hoctor et al. |
| 7,535,409 | B1 | 5/2009 | Choe et al. |
| 7,609,198 | B2 | 10/2009 | Chang |
| 8,312,771 | B2 | 11/2012 | Randall et al. |
| 8,482,455 | B2 | 7/2013 | Kemkemian et al. |
| 9,470,782 | B2 | 10/2016 | Millar et al. |
| 9,541,638 | B2 | 1/2017 | Jansen et al. |
| 9,869,762 | B1 | 1/2018 | Alland et al. |
| 10,048,366 | B1 | 8/2018 | Hong et al. |
| 10,509,119 | B2 | 12/2019 | Hong et al. |
| 2004/0178951 | A1 | 9/2004 | Ponsford et al. |
| 2007/0013575 | A1 | 1/2007 | Lee et al. |
| 2007/0285315 | A1 | 12/2007 | Davis et al. |
| 2008/0122681 | A1 | 5/2008 | Shirakawa |
| 2008/0291077 | A1 | 11/2008 | Chang |
| 2009/0174590 | A1 | 7/2009 | Huizing et al. |
| 2009/0201206 | A1 | 8/2009 | Li et al. |
| 2010/0019954 | A1 | 1/2010 | Mizutani et al. |
| 2010/0156701 | A1 | 6/2010 | Shirakawa |
| 2010/0194629 | A1 | 8/2010 | Craig et al. |
| 2010/0220001 | A1 | 9/2010 | Longstaff |
| 2010/0328157 | A1 | 12/2010 | Culkin et al. |
| 2011/0050500 | A1 | 3/2011 | Shirakawa |
| 2012/0112954 | A1 | 5/2012 | Kurono et al. |
| 2012/0268309 | A1 | 10/2012 | Samuel et al. |
| 2012/0299773 | A1 | 11/2012 | Stirling-Gallacher et al. |
| 2013/0069818 | A1 | 3/2013 | Shirakawa et al. |
| 2013/0120191 | A1 | 5/2013 | Zhang et al. |
| 2013/0300596 | A1 | 11/2013 | Shirakawa |
| 2014/0197984 | A1 | 7/2014 | Wang et al. |
| 2015/0102954 | A1 | 4/2015 | Hong |
| 2015/0270609 | A1* | 9/2015 | Jin .......................... H01Q 3/30 342/372 |
| 2017/0082730 | A1* | 3/2017 | Kishigami ........... H01Q 21/061 |
| 2017/0141454 | A1 | 5/2017 | Welle |
| 2017/0212213 | A1* | 7/2017 | Kishigami .............. G01S 13/04 |
| 2018/0024235 | A1* | 1/2018 | Hong ..................... G01S 13/87 342/59 |
| 2018/0088224 | A1 | 3/2018 | Kishigami |
| 2019/0386712 | A1 | 12/2019 | Fang |
| 2020/0025914 | A1 | 1/2020 | Li et al. |
| 2020/0081110 | A1 | 3/2020 | Nam et al. |
| 2020/0191939 | A1 | 6/2020 | Wu et al. |
| 2020/0191940 | A1 | 6/2020 | Wu et al. |
| 2020/0200892 | A1 | 6/2020 | Rajab et al. |

OTHER PUBLICATIONS

International Search Report and Written Opinion dated Oct. 4, 2019 for Application No. PCT/US2019/40696.

Li , et al., "Target Tracking in Uncertain Multipath Environment using Distributed Angle-of-Arrival Observation", retrieved from online on Apr. 4, 201 (Apr. 4, 2018); retrieved from URL:http://ieeexplore.ieee.org/document/7131228.

Hott, Maurice , et al., "Joint Super-Resolution and Array Interpolation for MIMO Radar Virtual Arrays", Proceedings of the 15th European Radar Conference, Sep. 26-28, 2018, Madrid, Spain.

Kellner, Dominik, et al., "Instantaneous Ego-Motion Estimation using Multiple Doppler Radars", 2014 IEEE International Conference on Robotics & Automation (ICRA) Hong Kong Convention and Exhibition Center May 31-Jun. 7, 2014, Hong Kong, China.

Rapp, Matthias , et al., "A Fast Probabilistic Ego-Motion Estimation Framework for Radak", 2015 European Conference on Mobile Robotics.

Gonzalez, Hector A., et al., "Doppler Ambiguity Resolution for Binary-Phase-Modulated MIMO FMCW Radars, 2019 International Radar Conference, Sep. 23-27, 2019."

Sun, Hongbo , et al., "Analysis and Comparison of MIMO Radar Waveforms", 2014 International Radar Conference, Oct. 13-17, 2014.

Japanese Office Action for application No. JP2020-537710 dated Jun. 22, 2021.

Korean Office Action for application No. 10-2020-7018559, dated May 21, 2021.

Chen, Qingchao , et al., "A coherent through-wall MIMO phased array imaging radar based on time-duplexed switching", Proceedings of SPIE, SPIE Defense + Security, 2017, Anaheim, California, United States.

* cited by examiner

☐ Physical RX

⬚ Virtual RX (VAA)

⋮ Virtual RX (Interp.)

SYSTEMS AND METHODS FOR INTERPOLATED VIRTUAL APERATURE RADAR TRACKING

CROSS-REFERENCE TO RELATED APPLICATIONS

This application is a continuation of Ser. No. 16/503,908 filed 5 Jul. 2019, which is a continuation-in-part of U.S. patent application Ser. No. 16/032,369, filed 11 Jul. 2018, which is a continuation of U.S. patent application Ser. No. 15/883,372, filed 30 Jan. 2018 (issued as U.S. Pat. No. 10,048,366 on 14 Aug. 2018), all of which are incorporated in their entireties by this reference.

TECHNICAL FIELD

This invention relates generally to the radar field, and more specifically to new and useful systems and methods for interpolated virtual aperture radar tracking.

BACKGROUND

Traditional array-based receivers calculate azimuth and/or elevation by measuring the time or phase difference between received probe signals at different receivers (or antennas) within the array(s), as shown in FIG. 1 (1D array), using beamforming (e.g., digital beamforming). Similar effects may be produced using a transmit array instead of a receiver array. These traditional solutions are limited: angular resolution depends both on the number of elements in the array and the angle between the array and the target:

$$\theta_{resolution} \approx \frac{\lambda}{Nd\cos\theta}$$

where N is the number of elements in the array and d is the distance separating them.

While array interpolation can be used to increase the resolution of such a system, typical interpolation schemes require a uniform array with sub-half-wavelength spacing and may have limited improvement over non-interpolated systems.

Thus, there is a need in the radar field to create new and useful systems and methods for interpolated virtual aperture radar tracking. This invention provides such new and useful systems and methods.

DESCRIPTION OF THE INVENTION EMBODIMENTS

The following description of the invention embodiments of the invention is not intended to limit the invention to these invention embodiments, but rather to enable any person skilled in the art to make and use this invention.

1. Virtual Aperture Array (VAA) Radar Tracking

As discussed in the background section, traditional array-based radar systems are limited: angular resolution depends both on the number of elements in the receiver array and the angle between the array and the target:

$$\theta_{resolution} \approx \frac{\lambda}{Nd\cos\theta}$$

where N is the number of elements in the array and d is the distance separating them.

Here, the number of array elements (and distance separating them) relates to the receiver's aperture; that is, more elements (or increased element spacing) results in increased receiver aperture. As the angular resolution formula makes clear, to increase angular resolution (without changing carrier frequency), one must increase the receiver's aperture. Typically, this is done by adding receiver array elements or increasing the separation distance between elements; however, these techniques increase either or both of the receiver array's physical size or its cost and physical complexity. Nevertheless, this traditional technique shines in that it increases radar resolution with relatively little change in processing latency.

Figure 1:
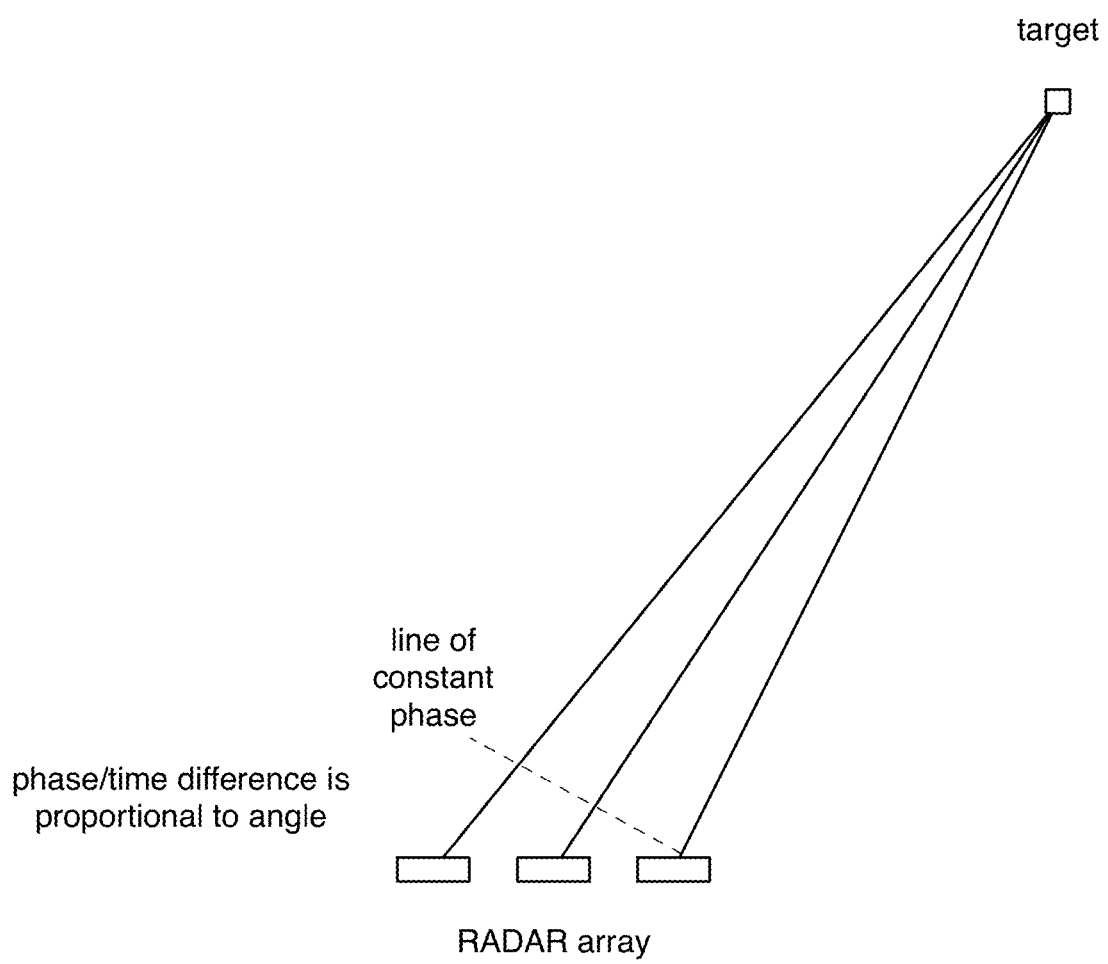
FIG. 1 is a prior art example diagram of a 1D receiver array radar system.
Figure 2A:
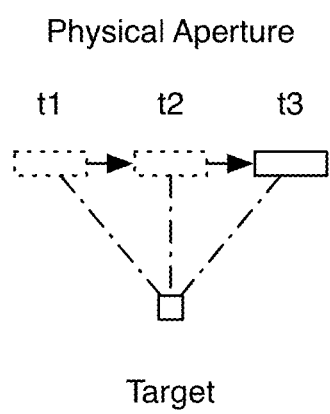
FIG. 2A is an example view of physical aperture in SAR tracking.
Figure 2B:
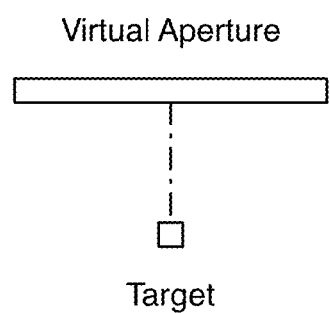
FIG. 2B is an example view of virtual aperture in SAR tracking.

As an alternative to this traditional technique, synthetic aperture radar (SAR) was created. In SAR, a moving antenna (or antenna array) captures multiple signals sequentially as it moves, as shown in FIG. 2A; these signals are then combined (using knowledge of the antenna's movement) to simulate the effect of a larger antenna, as shown in FIG. 2B. SAR manages to simulate increased radar aperture (thus increasing radar resolution), but requires precise antenna motion data and generally entails a significant increase in processing latency. Both requirements are problematic in many applications.

A novel technique, hereafter referred to as Virtual Aperture Array (VAA) radar tracking, was created to simulate increased radar aperture (as SAR does) without incurring the additional cost/size of increasing physical array size or the heavy downsides of SAR (e.g., motion data requirements and high processing latency). This technique was first introduced in parent U.S. patent application Ser. No. 15/883,372. Note that while the term "virtual aperture" has various uses in the field of radar tracking, as used in the present application, Virtual Aperture Array radar tracking specifically refers to the tracking techniques described herein (and not to any unrelated technology sharing the term).

Figure 3A:
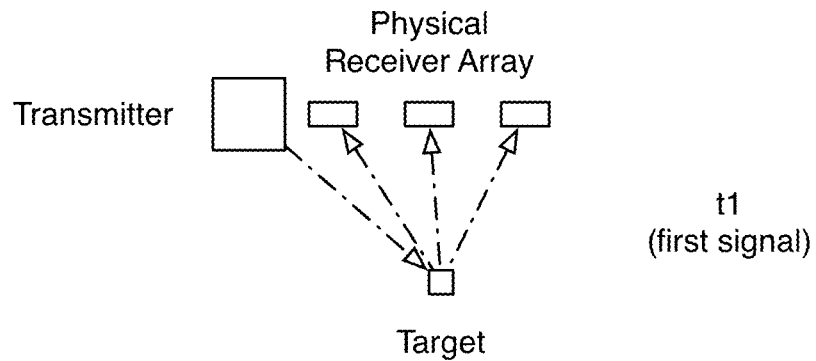
FIG. 3A is an example view of a first physical aperture in VAA tracking.
Figure 3B:
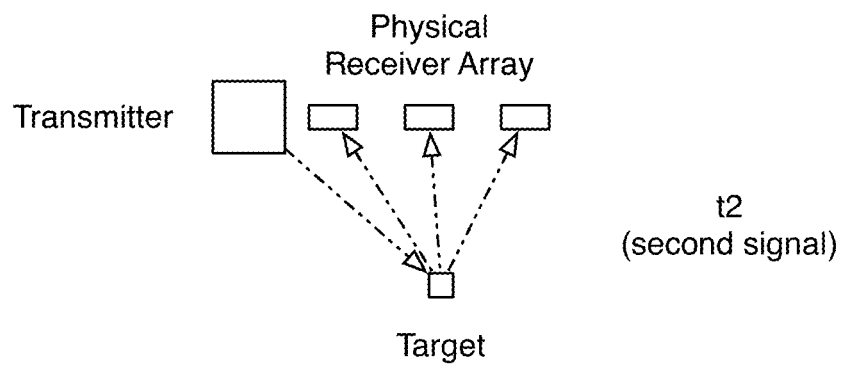
FIG. 3B is an example view of a second physical aperture in VAA tracking.
Figure 3C:
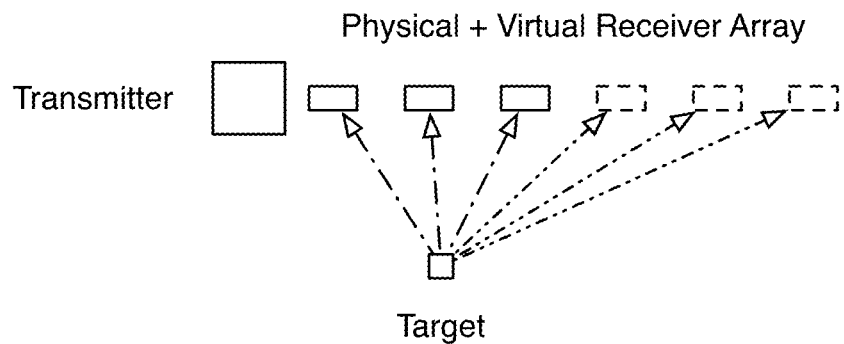
FIG. 3C is an example view of a virtual aperture in VAA tracking.

The VAA radar tracking technique functions by capturing instances of a first signal at a physical array simultaneously (like a traditional phased array), then capturing instances of a second signal at the same physical array (the instances of the second signal captured simultaneously, but not necessarily at the same time as the instances of the first signal are captured); if applicable, capturing additional instances in the same manner, and finally processing the data received from all captured instances together to generate a higher-resolution radar tracking solution than would otherwise be possible. Notably, the first and second signals (as well as any additional signals) are encoded with distinct phase information. This distinct phase information enables the instances of the second signal to be treated as being received at a virtual receiver array displaced from the physical array (creating a virtual aperture larger than the physical aperture). For example, a first signal may be captured as shown in FIG. 3A, having a first phase encoding, and a second signal may be captured as shown in FIG. 3B, having a second phase encoding; these signals may be processed together as shown in FIG. 3C.

Figure 4A:
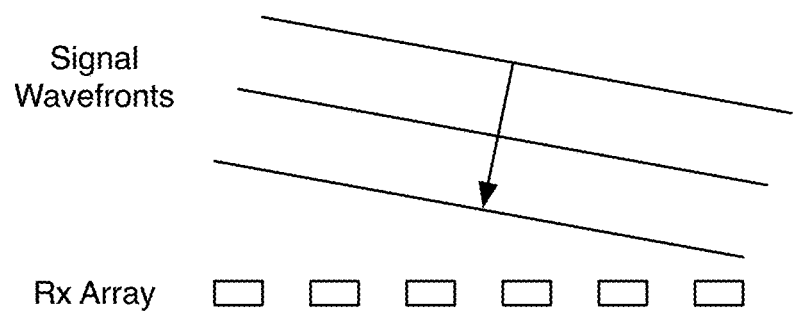
FIG. 4A is a diagram view of a signal incident on a traditional receiver array.
Figure 4B:
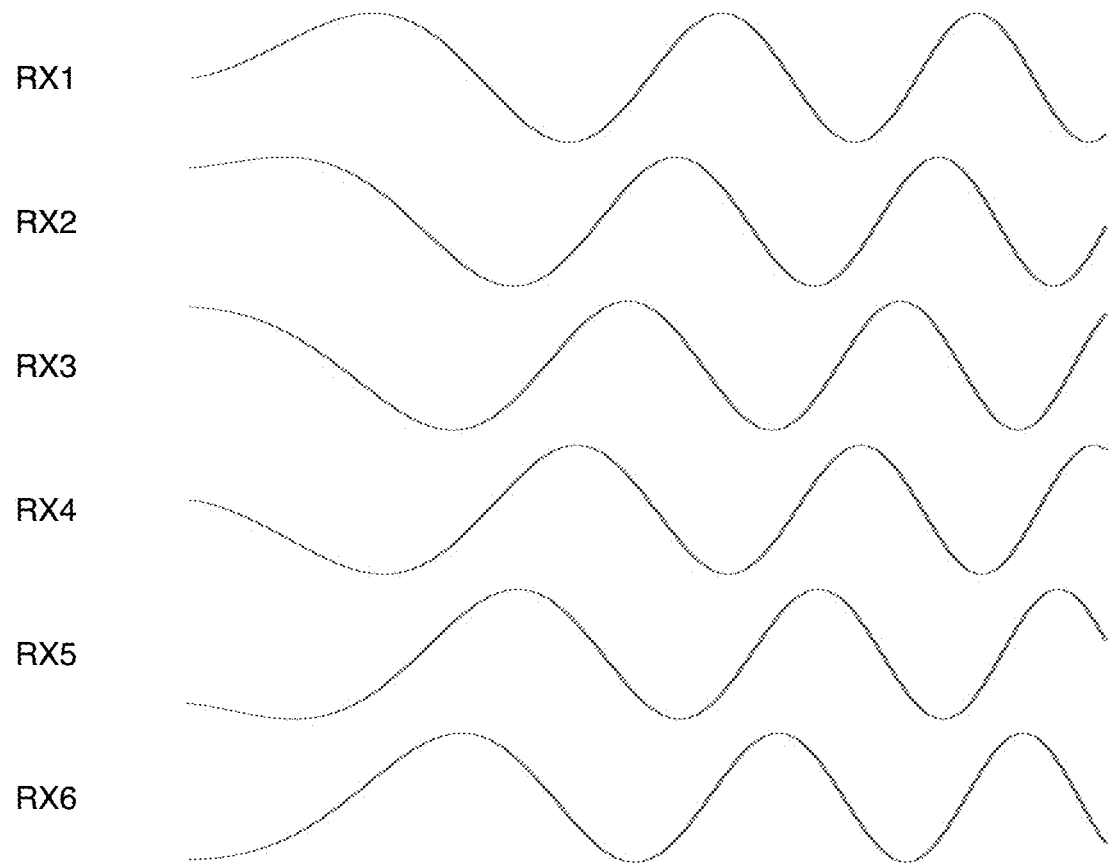
FIG. 4B is a signal view of a signal incident on a traditional receiver array.

As shown in FIG. 4A, when a reflected signal is received from a target at an angle (i.e., not normal to) the six-element radar array, the signal received at each receiver element in the array is phase shifted relative to the signal received at other elements in the array, as shown in FIG. 4B. From the phase shift and spacing between elements, the angle of the target to the array may be determined.

Figure 5A:
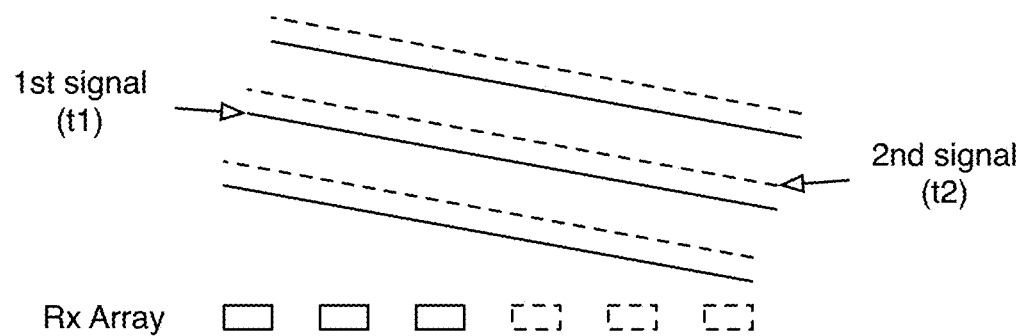
FIG. 5A is a diagram view of a signal incident on a VAA system.
Figure 5B:
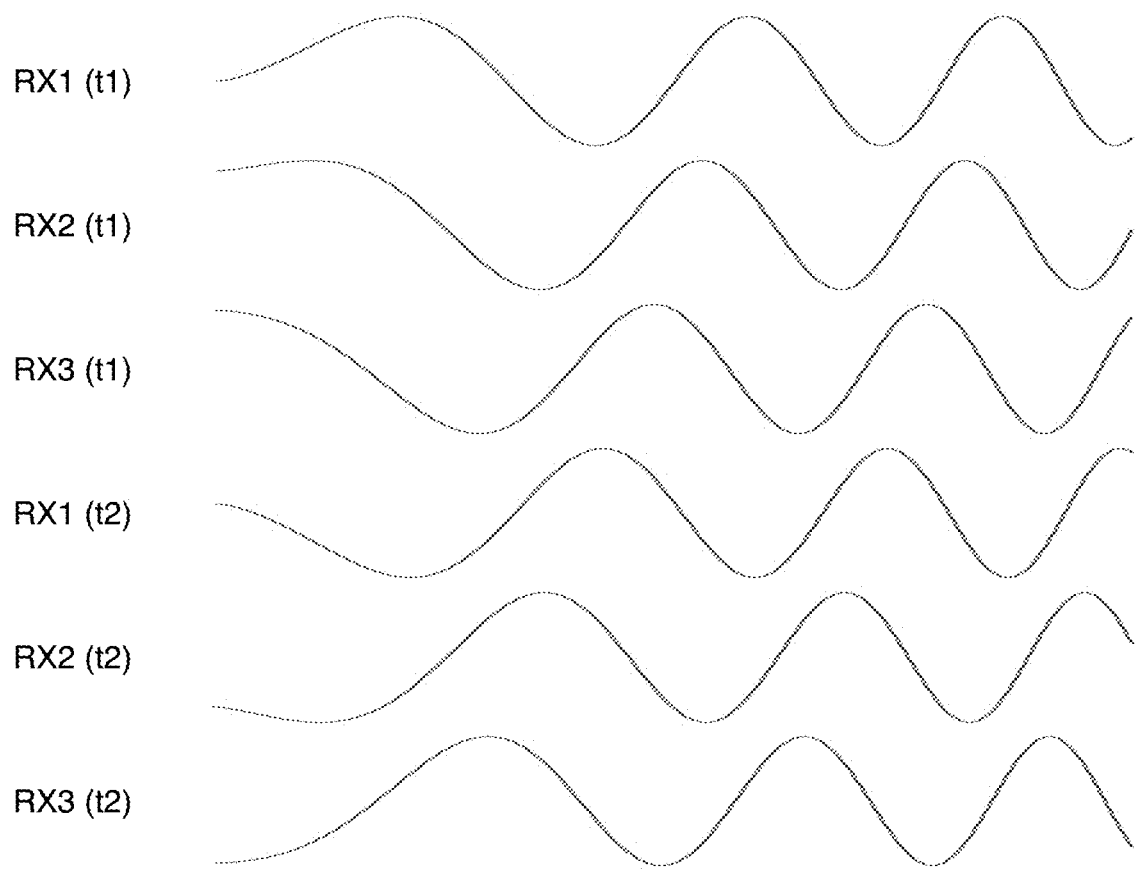
FIG. 5B is a signal view of a signal incident on a VAA system.

As shown in FIG. 5A, VAA can simulate the same aperture with only three elements through the use of two phase shifted signals, resulting in the signals at receiver elements as shown in FIG. 5B (note that the signal at RX1 at t2 is similar to the signal at RX4 in FIG. 4B, and so on). The positioning of the "virtual elements" is dependent on the phase shift between the first and second signals.

2. Method for Interpolated Virtual Aperture Array Radar Tracking

Figure 6:
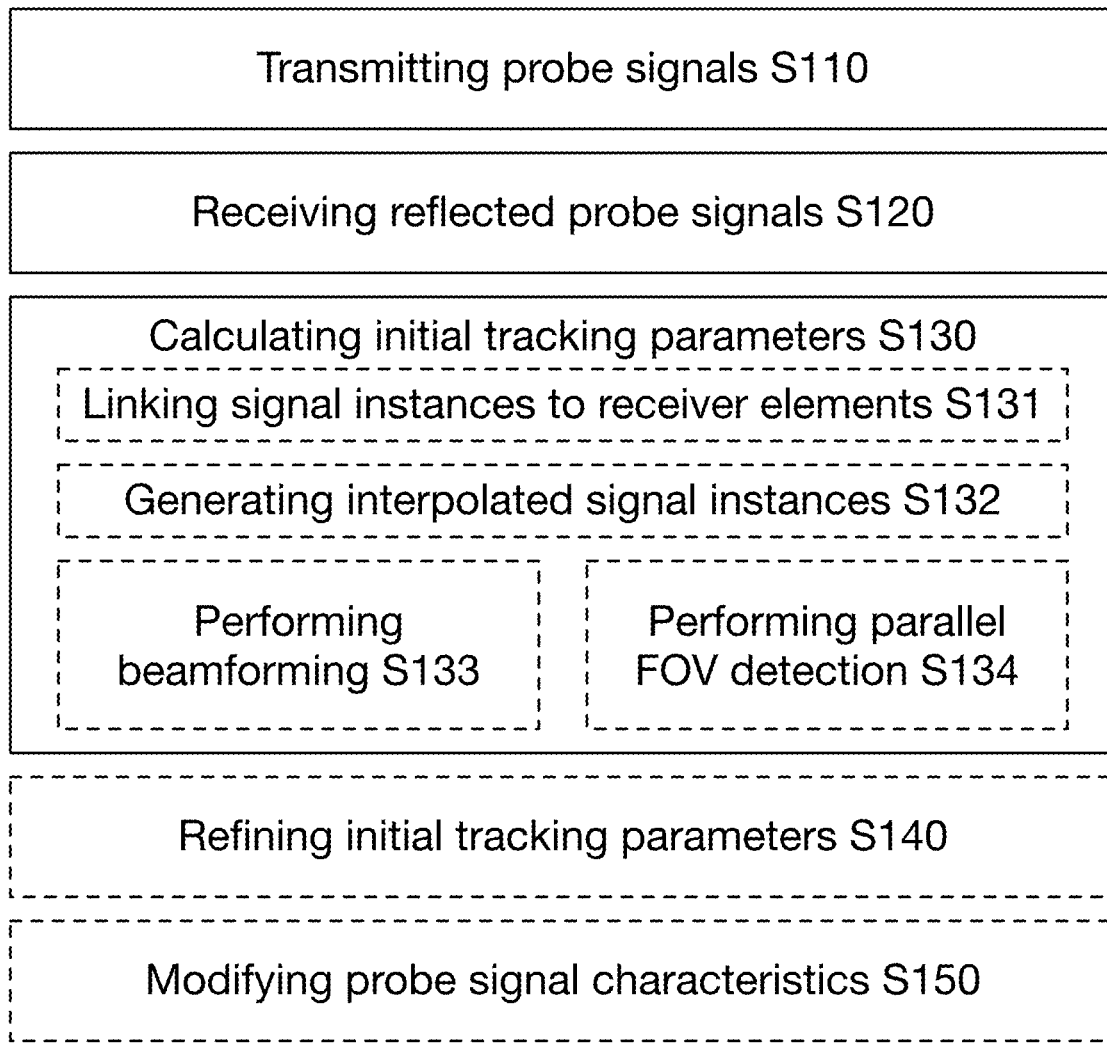
FIG. 6 is a chart view of a method of an invention embodiment.

A method 100 for interpolated virtual aperture array (IVAA) radar tracking includes transmitting a set of probe signals S110, receiving a set of reflected probe signals S120, and calculating initial tracking parameters from the set of reflected probe signals S130, as shown in FIG. 6. The method 100 may additionally include refining the initial tracking parameters S140 and/or modifying probe signal characteristics S150.

Figure 7A:
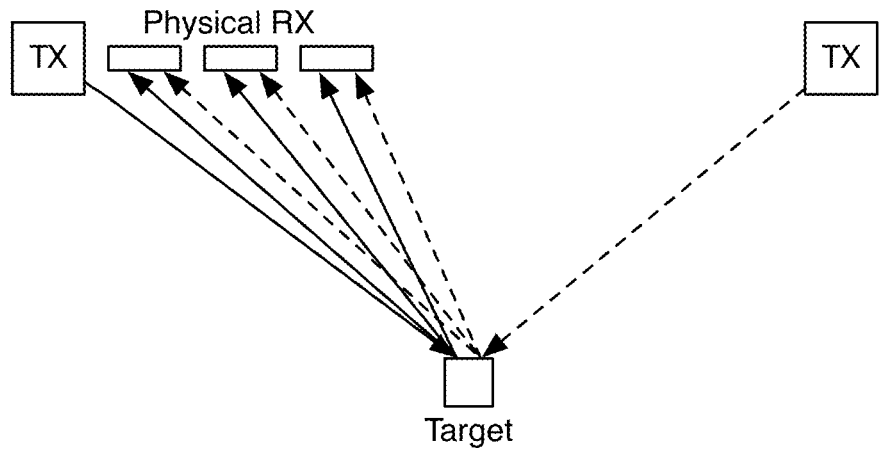
FIG. 7A is an example view of a first physical aperture in IVAA tracking.
Figure 7B:
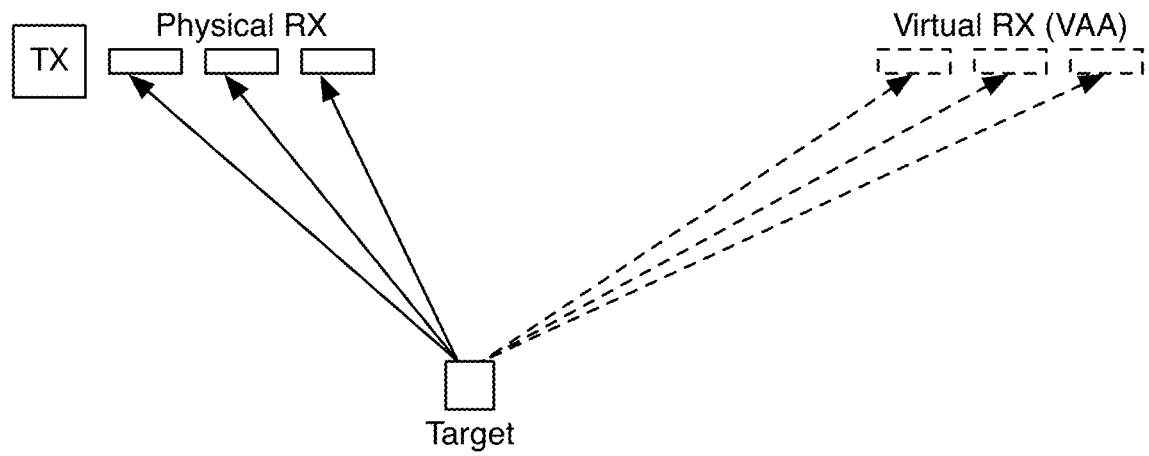
FIG. 7B is an example view of a pre-interpolation virtual aperture in IVAA tracking.
Figure 7C:
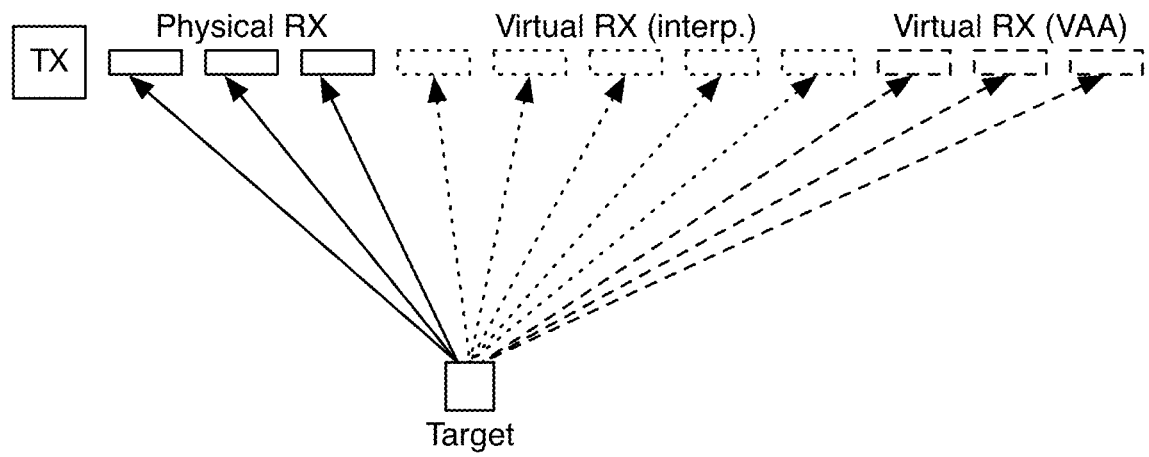
FIG. 7C is an example view of a post-interpolation virtual aperture in IVAA tracking.
Figure 7D:
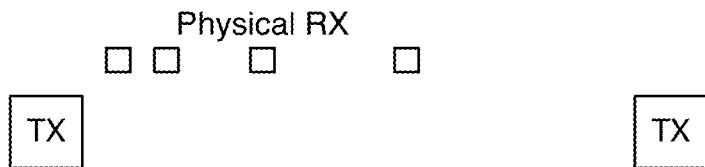
FIG. 7D is an example view of a first physical aperture in IVAA tracking.
Figure 7E:
FIG. 7E is an example view of a pre-interpolation virtual aperture in IVAA tracking.
Figure 7F:
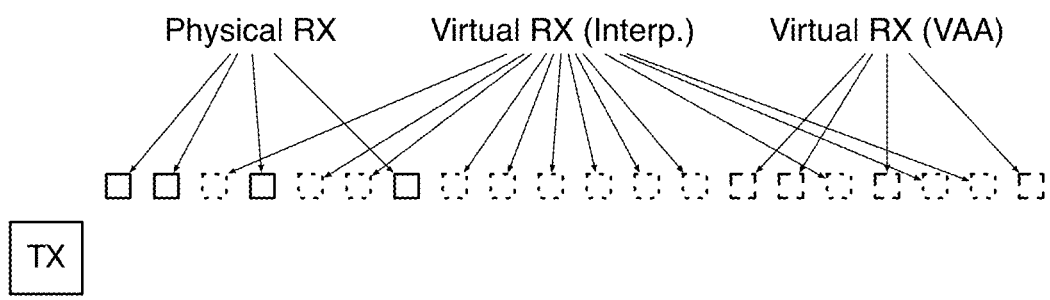
FIG. 7F is an example view of a post-interpolation virtual aperture in IVAA tracking.
Figure 7G:
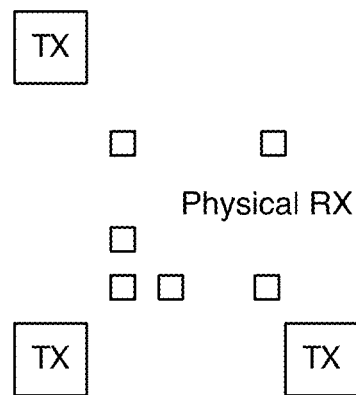
FIG. 7G is an example view of a first physical aperture in IVAA tracking.
Figure 7H:
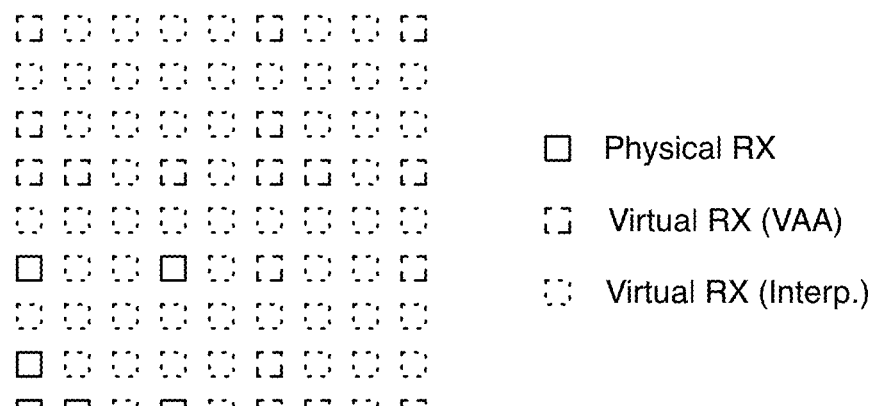
FIG. 7H is an example view of a post-interpolation virtual aperture in IVAA tracking.
Figure 7H:

While the original VAA technique is a powerful one (especially given that it can work well with small transmit and receive arrays), as the dimensions of the virtual array increase, so does error in the system. This is because each additional virtual element is essentially an extrapolation of the physical array. The present application is directed to a novel technique that builds upon aspects of the original VAA tracking, but does so within the framework of an interpolated sparse physical array (bounding the error that occurs from the addition of virtual array elements). For example, as shown in FIG. 7A, a (sparsely spaced) two-transmitter, three-receiver array; the receive array can receive probe signals from both transmitters and using VAA can process the signals as shown in FIG. 7B, increasing aperture and thus angular resolution. By incorporating interpolation, angular resolution can be further increased, as shown in FIG. 7C. Further examples of interpolation are as shown in FIGS. 7D-7F (note that in these examples, while a first pair of physical receiver elements may be spaced by some distance sub-half-wavelength, additional elements may be spaced farther) and 7G-7H (note here that while previous examples are given with respect to a 1D array, it is understood that this technique can be expanded to two or three dimensions). The performance of IVAA in such an implementation approaches that of a physical array while requiring a much smaller number of array elements, but IVAA's flexible nature can provide further advantages. As described in later sections, IVAA may utilize an FOV-detection-vector based approach to target identification, which can provide high angular resolution across a wide field-of-view (FOV) without the downsides of traditional beam-steering. This technique is hereafter referred to as "Parallel FOV Detection". Note that like VAA and IVAA, the term "parallel FOV detection" specifically refers to the detection technique described in later sections (and not to any unrelated technology sharing the term). Further, IVAA may itself utilize transmit and/or receive phase modification to further increase FOV.

The method 100 is preferably implemented by a system for IVAA radar tracking (e.g., the system 200), but may additionally or alternatively be implemented using any suitable object tracking system capable of performing virtual aperture array object tracking (e.g., SONAR, LIDAR).

S110 includes transmitting a set of probe signals. S110 functions to transmit a set of signals that, after reflection by a target, can provide information about the target (e.g., relative location, velocity, etc.). S110 preferably includes transmitting frequency shift keyed (FSK) RADAR signals or frequency-modified continuous wave (FMCW) RADAR signals, but S110 may include transmitting any signal satisfying these constraints; e.g., an electromagnetic signal (as in radio waves in RADAR, infrared/visible/UV waves in LIDAR), a sound signal (as in SONAR).

S110 preferably includes transmitting at least two distinct probe signals. The set of probe signals in S110 preferably satisfy two constraints: each of the set is distinct in phase (as measured from some reference point) and each of the set is distinguishable from other others upon reception. The distinction in phase enables the effective increase of aperture (and thus of angular resolution), while distinguish ability ensures that upon reception, signal data is appropriately processed given the distinction in phase.

Figure 8:
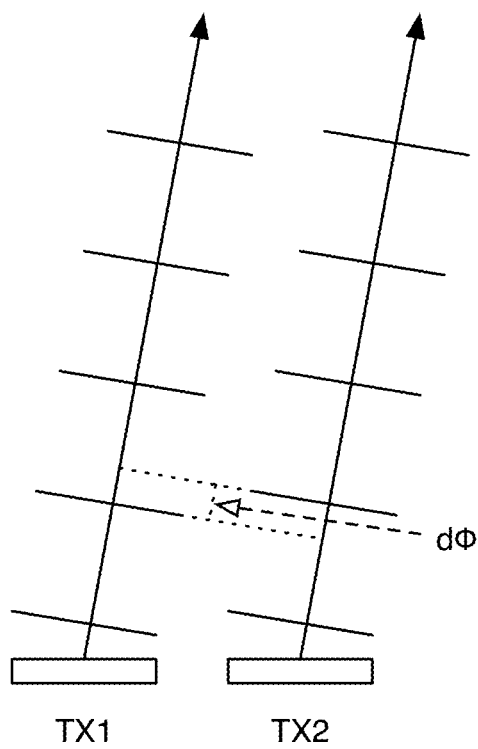
FIG. 8 is an example view of phase shift from two transmitter elements separated by a distance.

S110 may accomplish phase distinction in several manners. For example, S110 may include transmitting probe signals from physically distinct antenna elements. For a target at an angle from the transmitter elements, the separation encodes an inherent phase difference (one that is dependent on the angle!), as shown in FIG. 8. For two transmitters separated by a distance $d_{TX}$, the phase difference at a target at θ from normal is approximately $$d\phi = \frac{2\pi}{\lambda} d_{TX} \sin\theta$$

and the phase difference seen at the receiver is approximately the same.

Figure 9:
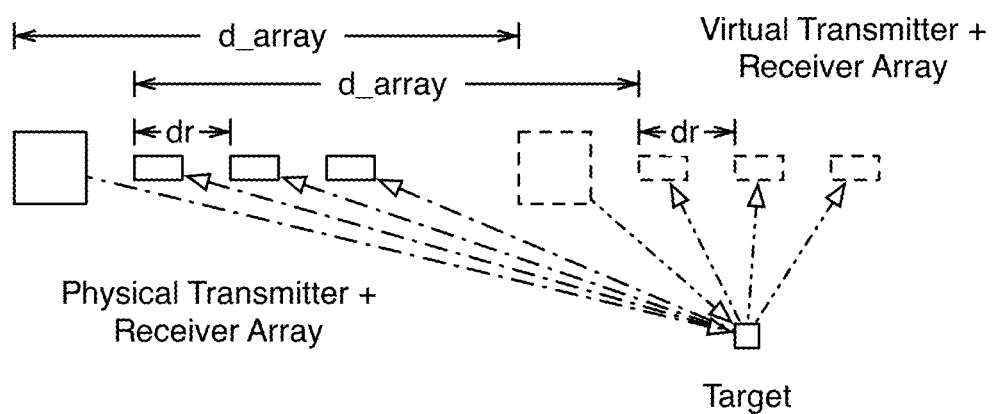
FIG. 9 is a diagram view of virtual transmitter and receiver elements in an IVAA system pre-interpolation.

As a second example, S110 may include transmitting probe signals at different times from the same antenna element(s), but with different phase information. For example, S110 may include transmitting a first signal from an antenna element at a first time, and then transmitting a second phase shifted signal from the same antenna element at a second time. Note that this is not equivalent to the phase difference in the first example; the phase difference dφ (between the first and second signal) seen at a target is (approximately) constant and independent of the target's angle. Also note that while this phase distinction results in the simulation of increased receiver elements, it also results in the simulation of increased transmitter elements, as shown in FIG. 9.

The result of this is that while phase distinction is generated by antenna element separation, the size of the virtual aperture is roughly the same for all target angles; in the explicit phase shifting example, the size of the virtual aperture is target-angle dependent. For example, in the transmitter separation case, the array shift can be written as $$d_{array} = d\phi \frac{\lambda}{2\pi} \frac{1}{\sin\theta} = d_{TX}$$

while in the explicit phase shifting case $$d_{array} = d\phi \frac{\lambda}{2\pi} \frac{1}{\sin\theta}$$

where dφ is a constant (and thus $d_{array}$ is target angle dependent).

While S110 preferably performs explicit phase shifting with a phase shifter (i.e., a device for which phase shift is ideally independent of frequency) S110 may additionally or alternatively perform explicit phase shifting using delay lines (or any other device for which phase shift depends on frequency) and/or any combination of time delays and phase shifters.

S110 may additionally or alternatively include combining phase shifting techniques (e.g., using multiple transmitters separated by a distance and phase-shifting the transmitters relative to one another).

Note that while examples are given with time-constant phase shifts, S110 may additionally or alternatively include modulating phase over time, by physically shifting transmitters (i.e., giving $d_{TX}$ time dependence) and/or by adding phase dφ where the phase is a function of time. The phase of the transmitted signal over time is referred to as the phase function. Phase functions may be referenced to any points. For example, if first and second antenna elements (separated by a non-zero distance) produce identical first and second signals respectively, it can be said that the phase function of the first signal (referenced to the first transmitter) is identical to the phase function of the second signal (referenced to the second transmitter). However, the phase of these two signals after reflection by a target at an angle from the transmitter array is not seen as identical at the target (or at the receiver array).

S110 may additionally or alternatively include modulating phase with respect to angle (e.g., by using a steerable or directional antenna and modulating phase while sweeping the antenna, using an antenna array and modulating phase for different elements of the array, etc.).

S110 may also accomplish signal distinguishability in any of several manners. As previously mentioned, one way in which S110 may enable signal distinguishability is by time-duplexing signals (e.g., transmitting a first frequency chirp signal with a first phase encoding, then a second signal with a second phase encoding); however, S110 may additionally or alternatively make signals distinguishable by frequency duplexing signals (e.g., transmitting a first frequency chirp signal within a first frequency band and transmitting a second frequency chirp signal within a second frequency band non-overlapping with the first), or by encoding the signals (e.g., using a distinct frequency modulation or amplitude modulation technique to distinguish a signal from others). S110 may additionally or alternatively accomplish signal distinguishability in any manner.

S120 includes receiving a set of reflected probe signals. S120 functions to receive data resulting from the reflection of the probe signal transmitted in S110. S120 preferably includes measuring phase, magnitude, and frequency information from reflected probe signals, but S120 may additionally or alternatively include measuring any available characteristics of the reflected probe signals.

S120 preferably includes measuring any data necessary to recover signal identification information (i.e., information to determine which signal of the transmitted set the reflected probe signal corresponds to).

S130 includes calculating initial tracking parameters from the set of reflected probe signals. S130 functions to calculate a set of tracking parameters that identify at least a position of the target relative to the radar receiver; additionally or alternatively, tracking parameters may include additional parameters relevant to object tracking (e.g., target velocity, target acceleration). Note that S130 may include calculating more tracking parameters for a given target than necessary to achieve a position solution; for example, as described later, while only range, azimuth angle, and elevation angle may be necessary to calculate object position, composite angle may also be calculated and used to refine and/or check azimuth/elevation angle calculations.

Further, while S130 primarily includes calculating tracking parameters from the reflected probe signals, S130 may additionally or alternatively calculate or otherwise receive parameters relevant to object tracking (e.g., radar egomotion velocity) that are not calculated using the probe signal.

Parameters used to establish target position may be defined in any coordinate system and base. In the present application, target position is preferably represented in a Cartesian coordinate system with the origin at the radar (e.g., x,y,z represents target position) or a spherical coordinate system with the same origin, wherein position is defined by range (R), azimuth (α), and elevation (θ); alternatively, target position may be described in any manner. Note that elevation (and similarly azimuth) is an example of an angle between a reference vector and a projected target vector; the projected target vector is the vector between the observer (e.g., the radar) and the target, projected into a reference plane (the reference plane containing the reference vector). The method 100 may include calculating any such angles.

While, as previously mentioned, any parameters relevant to object tracking may be calculated in S130, some additional parameters that may be calculated include target range rate (dR/dt, typically calculated from Doppler data), relative target velocity (the velocity of the target with respect to the radar receiver), radar egomotion velocity (referred to in this application as egovelocity, the velocity of the radar receiver relative to a stationary position). These may be related; for example, range rate is equivalent to relative target velocity multiplied by the cosine of the looking angle between the radar and the target.

Figure 10:
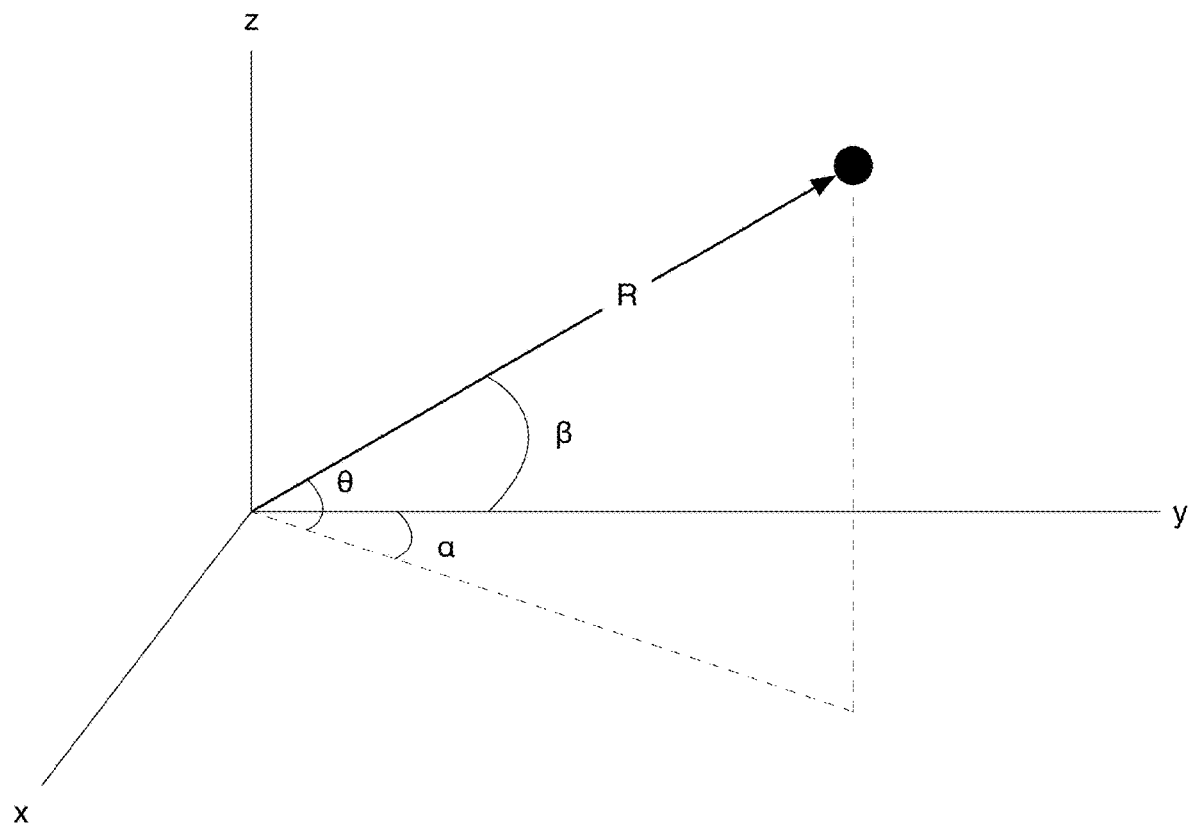
FIG. 10 is a Cartesian coordinate view of object position parameters.

S130 may additionally or alternatively include calculating composite angle (β, the angle between the target and the radar: β=arccos [cos α×cos θ], see also FIG. 10). While composite angle may be derived from elevation and azimuth (or vice versa), it may also be calculated from Doppler data. If, for example, elevation and azimuth are calculated from a first data source (e.g., phase differences between receivers in a receiver array) and composite angle is calculated from a second data source (e.g., Doppler frequency shift and relative velocity), composite angle can be used alongside elevation and azimuth to produce a more accurate solution.

S130 may include calculating tracking parameters from any suitable data source. For example, operating on a radar system with a horizontal receiver array, azimuth may be calculated based on phase differences between the reflected probe signal seen by each receiver in the array. Likewise, elevation may be calculated in a similar manner by a vertical receiver array (and/or elevation and azimuth may be calculated in similar manners by a two-dimensional receiver array). Range, for example, may be calculated based on travel time of a probe signal. Range rate, for example, may be calculated instantaneously (e.g., using Doppler frequency shift data) or over time (e.g., by measuring change in range over time). Composite angle, as previously discussed, may be derived from elevation/azimuth or calculated explicitly from Doppler data:

$$f_D \approx Kv\cos\beta; K = 2\frac{f_0}{c}.$$

S130 may additionally include calculating relative target velocity in any manner. For example, S130 may include determining that a target is stationary and calculating relative target velocity based on egovelocity (i.e., in this case, relative target velocity is egovelocity). A target may be determined as stationary in any manner; for example, by identifying the target visually as a stationary target (e.g., a stop sign may be identified by its appearance), by identifying the target by its radar cross-section as a stationary target (e.g., a stop sign or a road may be identified by shape or other features), by comparing Doppler data to other (e.g., phase) data (e.g., if the composite angle provided by Doppler data is substantially different from the composite angle derived from elevation and azimuth, that may be a moving target), by the size of the target, or in any other manner. Likewise, egovelocity may be determined in any manner (e.g., a GPS receiver or IMU coupled to the position of the radar receiver, external tracking systems, etc.). As another example, S130 may include receiving relative target velocity information based on external data; e.g., an estimate from a visual tracking system coupled to the position of the radar receiver. Relative target velocity information may even be provided by an external tracking system or the target itself (e.g., transmissions of IMU data from a target vehicle).

To determine Doppler frequency shift, S130 may include converting reflected signal data to the frequency domain using a Fast Fourier Transform (or any other technique to convert time domain signals to frequency domain for analysis). S130 may also improve system performance by using a Sliding Fast Fourier transform (SFFT) or similar techniques such as the Sliding Discrete Fourier Transform (SDFT) and Short-time Fourier Transform (STFT). These techniques allow Fourier transforms for successive samples in a sample stream to be computed with substantially lower computational overhead, improving performance.

S130 preferably includes calculating initial tracking parameters from two or more reflected probe signals by first linking signal instances to receiver elements S131 and generating interpolated signal instances S132. From the linked instances (including those generated via interpolation), S130 includes calculating the tracking parameters. S130 may then include calculating tracking parameters by performing beamforming (S133) and/or by performing parallel FOV detection (S134).

S131 includes linking signal instances to receiver elements. S131 functions to correspond signal instances received at a given receiver element to a real or virtual receiver element. For example, a radar system that time-duplexes first (zero-phase) and second (phase-shifted) signals may correspond a signal instance received at a physical receiver element either to that receiver element (if the reflected signal is the first signal) or to a shifted virtual receiver element (if the reflected signal is the second signal). Note that while in some cases the translation of virtual receiver elements is independent of target angle, in cases where the translation of virtual receiver elements depends upon target angle, it may be required to preliminarily determine target angle first (in order to know the position of virtual receiver elements) using one or more subsets of received signals (each subset corresponding to one of the unique transmitted signals) independently prior to using all received signals jointly. Alternatively stated, the virtual elements may be described in terms of the physical elements by an element translation function; if this translation function is not already known (as in the case of separated transmitters) S131 may include determining the element translation function for a given target.

S132 includes generating interpolated signal instances. S132 functions to generate additional signal instances from those captured, where these additional signal instances correspond to additional virtual receiver elements positioned between other receiver elements (either real or virtual). For example, if signal instances are linked to physical receiver elements at positions {0, d, 2d, 3d} and virtual receiver elements at {10d, 11d, 12d, 13d} in S131, S132 may include generating additional signal instances corresponding to virtual receiver elements at {4d, 5d, . . . , 8d, 9d}. S132 may use any technique for generating these interpolated signal instances.

In one embodiment, S132 includes generating linear combinations of phase modulated codes (transmitted by transmitters of the ranging system) to simulate signal components as would be expected and/or predicted across interpolated receiver elements.

S133 includes performing beamforming across receiver elements. Once data has been linked to real or virtual receiver element positions, S133 functions to calculate object tracking data (e.g., target range and angle) using beamforming techniques. Beamforming techniques that may be used by S133 include but are not limited to conventional (i.e., Bartlett) beamforming, Minimum Variance Distortionless Response (MVDR, also referred to as Capon) beamforming, Multiple Signal Classification (MUSIC) beamforming, or any other beamforming technique.

S133 preferably includes performing digital beamforming for a given object-tracking element array using every element (both real and virtual) in the array, but S133 may additionally or alternatively use any subset of elements to perform angle calculations. In some embodiments, S133 may include dynamically selecting the receiver elements used to perform digital beamforming techniques (e.g., based on receiver noise or any other relevant factor).

S134 includes performing parallel FOV detection. In parallel FOV detection, signals from receiver element pairs, each corresponding to a different field of view, are analyzed in parallel to determine angle-to-target.

Figure 11A:
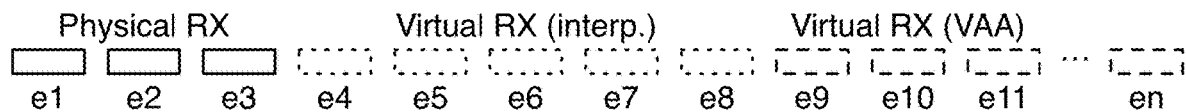
FIG. 11A is an example view of physical and virtual elements of an interpolated virtual aperture array.

For example, consider an array with n elements $\{e_1, \ldots, e_n\}$ (for example, as shown in FIG. 11A). n-1 pairs can be made with the first element: $\{e_{12}, \ldots, e_{1n}\}$. Each pair has an associated FOV given by:

$$FOV_i = 2\sin^{-1}\frac{\lambda}{2(i-1)d}$$

Where d is the interelement spacing. Note that while this formula assumes a regular interelement spacing, it is understood that elements need not be spaced regularly (and even without regular interelement spacing, the basic relationship that FOV is inverse to the distance between the 1st and ith elements holds). The FOV of the system of the whole (i.e., the widest FOV) is the FOV of the first two elements:

$$FOV_2 = 2\sin^{-1}\frac{\lambda}{2d}$$

In a traditional phased-array radar system, the angular resolution of such an array is $$\delta\alpha \approx \frac{\lambda}{Nd\cos\alpha}.$$

Note here that as angle moves away from center angle $\alpha=0$, resolution decreases. For example, while $$\delta\alpha\big|(\alpha = 0) \approx \frac{\lambda}{Nd}$$

(the resolution at the center angle), $$\delta\alpha\bigg|\left(\alpha = \sin^{-1}\frac{\lambda}{2d}\right) \approx \frac{\lambda}{N\sqrt{d^2 - \frac{\lambda^2}{4}}} \to \infty \left(\text{for } d = \frac{\lambda}{2}\right).$$

This is why beamforming is often performed for such arrays—by steering the center angle across the FOV, a high angular resolution can be achieved (but this requires that phase be modified over time to accomplish beamsteering).

Figure 11B:
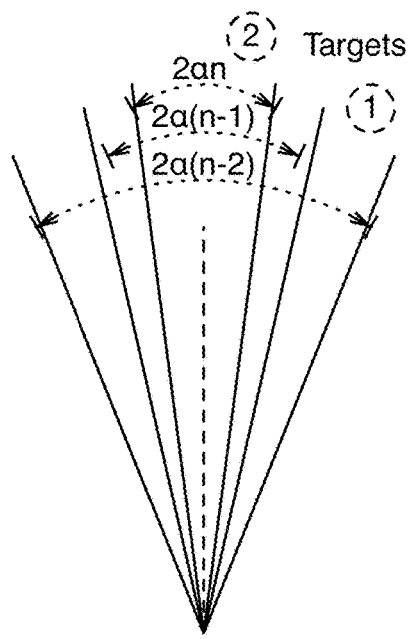
FIG. 11B is an example view of fields-of-view corresponding to an interpolated virtual aperture array.

In parallel FOV detection, instead of beamsteering across a wide FOV to preserve angular resolution, FOV detection vectors are generated for multiple FOVs. For example, as shown in FIG. 11B, consider two targets (target 1 and target 2). Target 1 exists in the third-narrowest FOV (width of $$FOV_{n-2} = 2\sin^{-1}\frac{\lambda}{2(n-3)d}$$

and every wider FOV $\{FOV_{n-2}, \ldots FOV_2\}$, while Target 2 exists in all FOVs $\{FOV_n, \ldots FOV_2\}$. By performing target detection on a set of FOVs in parallel, FOV detection vectors for each detected target can be generated. For example, Target 1 (at angle $\theta_1$) might be associated with an FOV detection vector that looks like $\{\theta_1, \ldots, \theta_1, x, x\}$. The first series of $\theta_1$s represent that Target 1 has been detected at $\theta_1$ by each of the element pairs $e_{12} \ldots e_{1(n-2)}$ while the x's show non-detects at $\{e_{1(n-1)}, e_{1n}\}$. Likewise, Target 2 might be associated with an FOV detection vector that looks like $\{\theta_2, \ldots, \theta_2, \theta_2, \theta_2\}$.

Stated alternatively, FOV detection vectors may be calculated for pairs of the superset of radar array elements comprising the physical elements of the array as well as first and second sets of virtual elements (corresponding to virtual elements generated from phase-shifting and interpolation respectively).

Notably, at wider angles, angular resolution is poor (as described above). However, the difference in angle between FOVs is relatively small. For example, imagine an array with 2λ element spacing and ten elements. The FOVs are as follows: {29°, 14.4°, 9.6°, 7.2°, 5.7°, 4.8°, 4.1°, 3.6°, 3.2°}. An element is detected in $FOV_4 \ldots FOV_{10}$ (i.e., within 0±4.8°). The difference between $FOV_3$ and $FOV_4$ in magnitude is 2.4°. At this angle, the angular resolution for a traditional array (without performing beamsteering, using only three elements) would be 9.6°. (We only use three elements because a 4+ element array with this spacing would have an FOV narrower than the region the target is in). Likewise, a traditional array with beamsteering achieves a resolution of 2.8°. The takeaway here is that parallel FOV detection can achieve accuracy comparable to that of beamsteering (without actually needing to perform the time-intensive phase modulation required to perform beamsteering).

Thus, S134 preferably includes generating FOV detection vectors for detected targets, and determining angles-to-target from the FOV detection vectors. Each detection vector preferably contains an entry for each FOV window (corresponding to each possible pair of a reference receiver element and all other receiver elements) corresponding to whether or not a target was detected (and/or values usable to indicate the same, such as detection probability magnitudes and/or the calculated angle to target from that receiver pair); additionally or alternatively, FOV detection vectors may contain any information relevant to determining target angle. FOV detection across FOVs preferably occurs simultaneously but may additionally or alternatively occur sequentially or in any manner.

Note that the above examples are given with respect to a single transmit signal. When multiple transmit signals are used (e.g., via time multiplexing or via multiple transmitter elements), detection vectors may include data for each transmit signal. Notably, because the transmit elements may themselves be in an array (physical, virtual, or otherwise), the use of multiple transmit signals may further increase the angular resolution of the method 100 (i.e., the transmit signals themselves form "fields of view").

S140 includes refining the initial tracking parameters. S140 functions to generate a more accurate tracking solution than that initially calculated by S130. In a first example implementation, S140 includes running a Kalman filter on Cartesian coordinates of a target generated from elevation angle or azimuth angle (determined from phase information), range, and composite angle, constrained by error bounds of the composite angle. In a second example implementation, S140 includes running a Kalman filter on Cartesian coordinates of a target generated from elevation angle and azimuth angle (determined from phase information), range, and composite angle constrained by error bounds of the composite angle.

S140 may additionally or alternatively include filtering, refining, and/or constraining tracking parameters in any manner.

S150 includes modifying probe signal characteristics. S150 functions to modify characteristics of the transmitted probe signals (at either or both of transmitter and receiver elements) to ensure high performance of the radar tracking algorithm. One of the advantages of the method 100 is that virtual transmitter/receiver elements can be added (and the virtual aperture expanded) or removed at will. Adding more virtual elements increases the potential accuracy of object tracking performed by the method 100, but also increases the latency of object tracking.

S150 may include modifying probe signal characteristics based on the output of S130; for example, if during object tracking it is detected that a first set of data (corresponding to an earlier-transmitted signal and real receivers, for example) and a second set of data (corresponding to a later-transmitted signal and virtual receivers) fail to converge upon an object tracking solution within some threshold error bounds, S150 may include modifying the transmitted signal to reduce the number of virtual elements (e.g., reducing the number of distinct phase-encoded signals from three to two).

S150 may alternatively include modifying probe signal characteristics based on other data. For example, S150 may include modifying probe signal data based on radar array motion (e.g., the speed of an automobile for a car-mounted radar); modifying transmission to increase virtual aperture when the car is moving more slowly and modifying transmission to decrease virtual aperture when the car is moving more quickly.

S150 may additionally or alternatively include modifying probe signal characteristics (at either transmitter or receiver) in any manner.

Figure 12A:
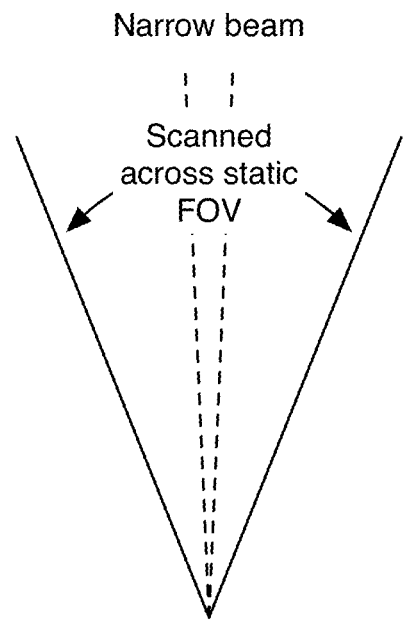
FIG. 12A is an example view of traditional beamforming.
Figure 12B:
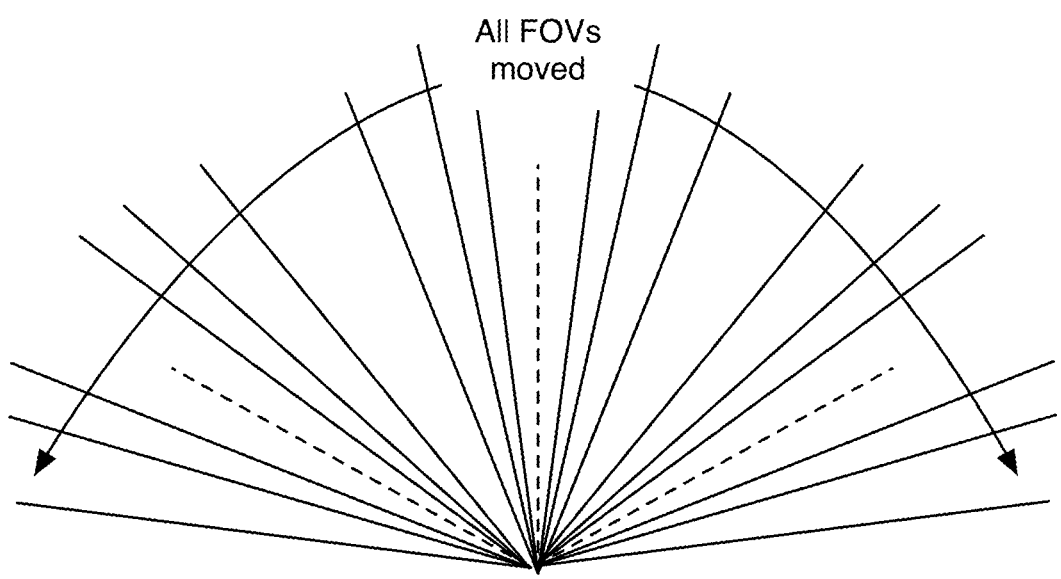
FIG. 12B is an example view of beamsteering of a method of an invention embodiment.

In one implementation of an invention embodiment, S150 includes performing beamsteering on one or both of transmit and receive signals. In contrast to the beamforming described previously for traditional linear radar arrays (where a narrow beam is scanned across a wide and static FOV, as shown in FIG. 12A), the beamsteering of S150 functions to shift the center angle of all FOVs, as shown in FIG. 12B. Beamsteering is preferably performed by modifying the phase of transmit signals either at transmit elements or at receive elements, but may additionally or alternatively be performed in any manner. Beamsteering may be used to further increase angular resolution (by scanning the entire $FOV_2$ with a known deflection angle while detected targets cross FOV boundaries, detection accuracy/resolution can be improved).

Figure 13:
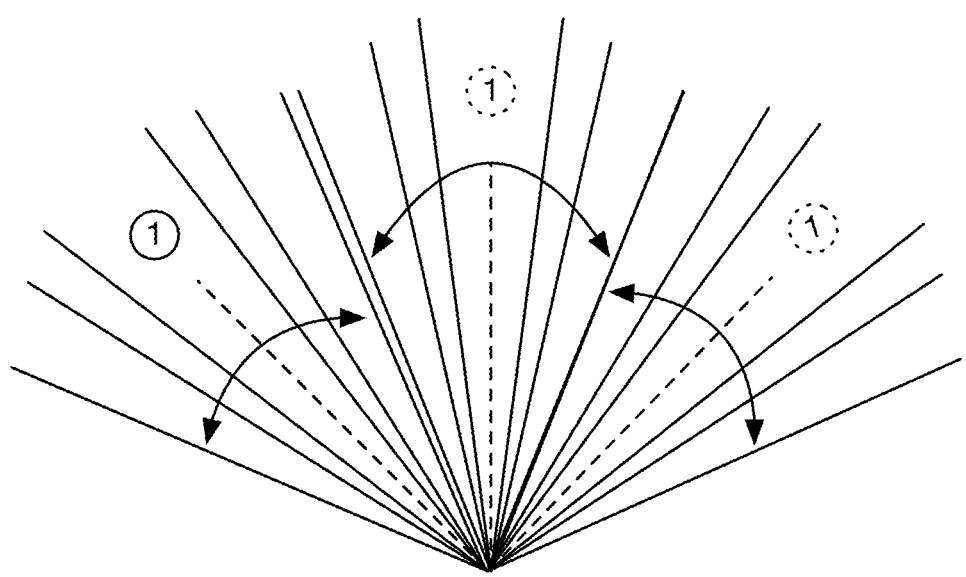
FIG. 13 is an example view of target aliases.
Figure 14A:
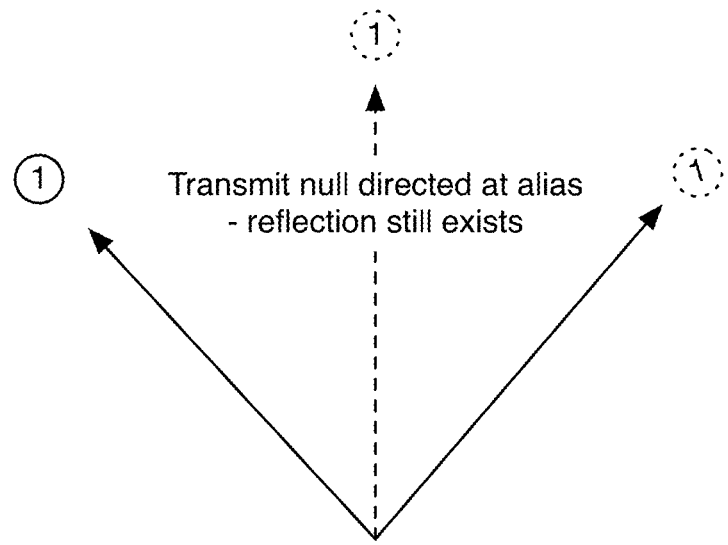
FIG. 14A is an example view of transmit beamsteering of a method of an invention embodiment.
Figure 14B:
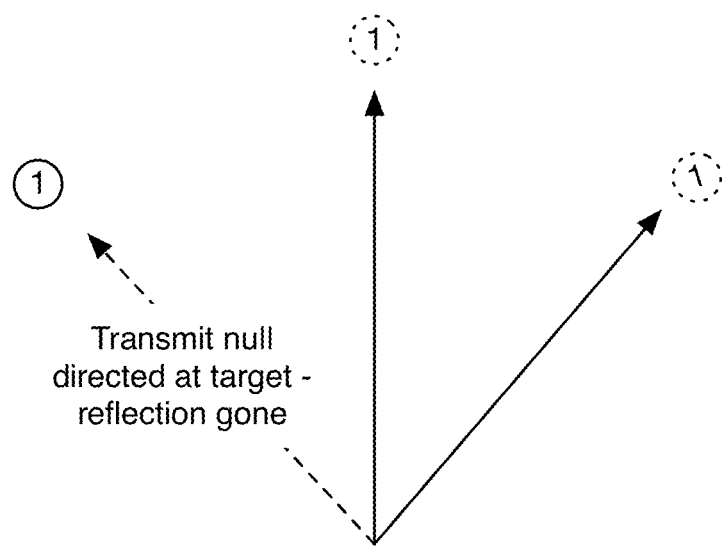
FIG. 14B is an example view of transmit beamsteering of a method of an invention embodiment.

Note that because the spacing may be larger than $$\frac{\lambda}{2}$$

between array elements, aliasing may occur, as shown in FIG. 13. In such cases, S150 may include steering or otherwise modifying signals (at transmitter and/or receiver) to aid in the rejection of aliases. For example, transmitter FOVs may be scanned independently of receiver FOVs, removing the symmetry otherwise preventing the detection of the true target over aliases. For example, if a transmit array is scanned such that a null of the transmit pattern falls on the alias, the target will still show up (as shown in FIG. 14A), whereas if the null falls on the real target, the target will not have a transmit signal to reflect, as shown in FIG. 14B.

2. System for Interpolated Virtual Aperture Array Radar Tracking

Figure 15:
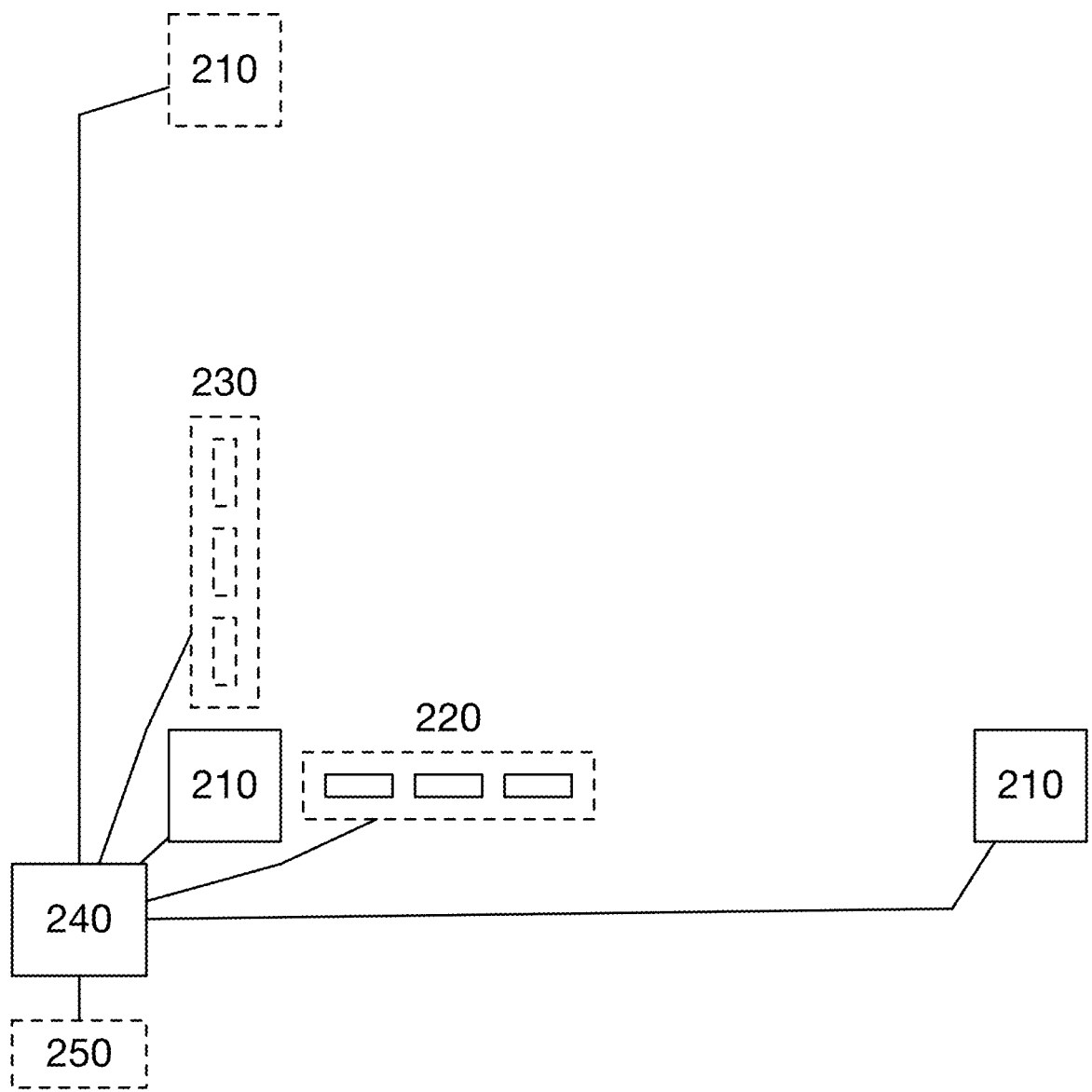
FIG. 15 is a diagram view of a system of an invention embodiment.

A system 200 for interpolated virtual aperture array (IVAA) radar tracking includes a transmitter array 210, a horizontal receiver array 220, and a signal processor 240, as shown in FIG. 15. The system 200 may additionally include a vertical receiver array 230 and/or a velocity sensing module 250.

Figure 16:
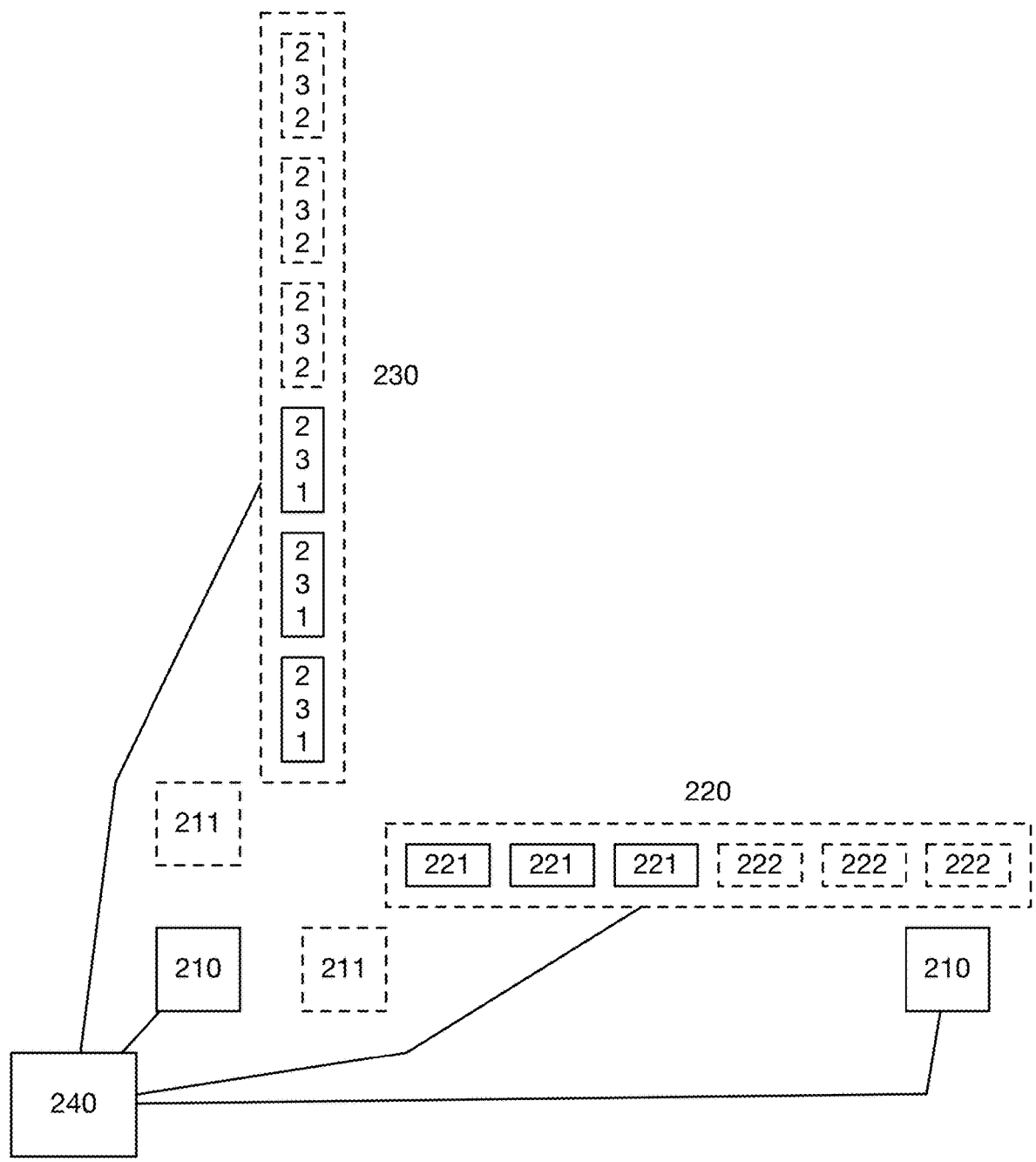
FIG. 16 is a diagram view of a system of an invention embodiment.

Further, the system 200 may include any number of virtual transmitters 211 and/or virtual receiver elements 222/232, as shown in FIG. 16 (while not explicitly shown here, it is understood that such virtual receiver elements may also include interpolated elements as described in the method 100).

Similarly to the method 100, the system 200 utilizes IVAA radar tracking to simulate increased radar aperture (as SAR does) without incurring the additional cost/size of increasing physical array size or the heavy downsides of SAR (e.g., motion data requirements and high processing latency).

The IVAA radar tracking technique of the system 200 functions by capturing instances of a first signal at a physical array simultaneously (like a traditional phased array), then capturing instances of a second signal at the same physical array (the instances of the second signal captured simultaneously, but not necessarily at the same time as the instances of the first signal are captured); if applicable, capturing additional instances in the same manner, and finally processing the data received from all captured instances together to generate a higher-resolution radar tracking solution than would otherwise be possible. Notably, the first and second signals (as well as any additional signals) are encoded with distinct phase information. This distinct phase information enables the instances of the second signal to be treated as being received at a virtual receiver array displaced from the physical array (creating a virtual aperture larger than the physical aperture). For example, a first signal may be captured as shown in FIG. 4A, having a first phase encoding, and a second signal may be captured as shown in FIG. 4B, having a second phase encoding; these signals may be processed together as shown in FIG. 4C.

The transmitters 210 function to transmit a signal that, after reflection by a target, can provide information about the target (e.g., relative location, velocity, etc.). The transmitter 210 preferably transmits a frequency shift keyed (FSK) RADAR signal or a frequency-modified continuous wave (FMCW) RADAR signal, but the transmitter 210 may transmit any signal satisfying these constraints; e.g., an electromagnetic signal (as in radio waves in RADAR, infrared/visible/UV waves in LIDAR), a sound signal (as in SONAR).

The transmitter 210 preferably has multiple transmitting elements (e.g., a transmit array), but may additionally or alternatively have a single transmitting element (e.g., a transmit antenna). If the transmitter 210 has multiple elements, these elements may include a single transmitter paired to multiple antennas (e.g., spaced in a particular pattern and/or with antennas coupled to phase/time delays); multiple transmitters, each paired to a single antenna; multiple transmitters paired to multiple antennas, or any other configuration. For example, a transmitter 210 may include transmitter elements spaced by a distances substantially greater (e.g., >3x) the distance between receiver elements. Likewise, transmitter arrays may be oriented in any manner relative to receiver arrays.

In addition to the transmitter 210, the system 200 may additionally include any number of virtual transmitters 211. As described in the section of the method 100, virtual transmitters are created by phase-shifting the output of one or more real transmitters 210 and may correspond to a translated element of the transmitter 210.

The horizontal receiver array 220 functions to receive data resulting from the reflection of the probe signal(s) transmitted by the transmitter 210. The horizontal receiver array 220 preferably measures phase, magnitude, and frequency information from reflected probe signals, but the horizontal receiver array 220 may additionally or alternatively measure any available characteristics of the reflected probe signals.

From data received from the horizontal receiver array 220, tracking parameters relating to a tracking target may be calculated. The horizontal receiver array 220 is preferably used to determine azimuth ($\alpha$), as shown in FIG. 9, but parameters used to establish target position may be defined in any coordinate system and base, and the horizontal receiver array 220 may be used to determine any relevant tracking parameters. In the present application, target position is preferably represented in a Cartesian coordinate system with the origin at the radar (e.g., x,y,z represents target position) or a spherical coordinate system with the same origin, wherein position is defined by range (R), azimuth ($\alpha$), and elevation ($\theta$); alternatively, target position may be described in any manner. Note that elevation (and similarly azimuth) is an example of an angle between a reference vector and a projected target vector; the projected target vector is the vector between the observer (e.g., the radar) and the target, projected into a reference plane (the reference plane containing the reference vector). The system 100 may calculate any such angles.

The horizontal receiver array 220 includes a set of receiver elements 221 arranged in a pattern; e.g., along a horizontal axis. The set of receiver elements 221 may include a single receiver paired to multiple antennas (e.g., spaced in a particular pattern and/or with antennas coupled to phase/time delays); multiple receivers, each paired to a single antenna; multiple receivers paired to multiple antennas, or any other configuration.

The horizontal receiver array 220 may additionally include any number of virtual receiver elements 222. As described in the section of the method 100, virtual receiver elements 222 are created in response to the phase-shifting of output of one or more real transmitters 210 (or by interpolation) and may correspond to a translated receiver element 221 of the horizontal receiver array 220.

The horizontal receiver array 220 preferably is used to calculate angles from phase information, but may additionally or alternatively be used to calculate angles in any manner (e.g., using horizontal component of Doppler frequency shift).

The vertical receiver array 230 is preferably substantially similar to the horizontal receiver array 220, except that the vertical receiver array is arranged upon an axis not parallel to the axis of the horizontal receiver array (e.g., a vertical axis). The vertical receiver array 230 is preferably used to calculate elevation, but may additionally or alternatively be used to calculate any tracking parameters. The vertical receiver array 230 includes a number of receiver elements 231 and may additionally include any number of virtual receiver elements 232. As described in the section of the method 100, virtual receiver elements 232 are created in response to the phase-shifting of output of one or more real transmitters 210 and may correspond to a translated receiver element 231 of the vertical receiver array 230.

The signal processor 240 functions to calculate tracking parameters from data collected by the horizontal receiver array 220, the vertical receiver array 230, and/or the velocity sensing module 250. The signal processor 240 preferably includes a microprocessor or microcontroller that calculates tracking parameters according to the method 100; additionally or alternatively, the signal processor 240 may calculate tracking parameters in any manner. The signal processor 240 may additionally or alternatively be used to communicate with an external computer (e.g., to offload computations, receive additional data, or for any other reason). The signal processor 240 may also control configuration of the components of the system 200 or any calculations or actions performed by the system 200. For example, the signal processor 240 may be used to control creation and/or other parameters of virtual transmitters or virtual array elements as described in the section of the method 100.

The velocity sensing module 250 functions to determine the velocity of the system 200 (or components of the system 200, or an object coupled to the system 200). The velocity sensing module is preferably a communications interface that couples to an inertial measurement unit (IMU), but may additionally or alternatively be any communications interface (e.g., Wi-Fi, Ethernet, ODB-II) or sensor (accelerometer, wheel speed sensor, IMU) capable of determining a speed and/or velocity.

The methods of the preferred embodiment and variations thereof can be embodied and/or implemented at least in part as a machine configured to receive a computer-readable medium storing computer-readable instruction. The instructions are preferably executed by computer-executable components preferably integrated with a system for IVAA radar tracking. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for virtual aperture array radar tracking, comprising:
    at a radar transmitter, transmitting a first probe signal, the first probe signal having a first phase function;
    at the radar transmitter, transmitting a second probe signal, the second probe signal having a second phase function;
    at a set of physical receiver elements of a radar receiver, receiving a first set of signal instances corresponding to a first reflected probe signal in response to reflection of the first probe signal by a tracking target;
    at the set of physical receiver elements, receiving a second set of signal instances corresponding to a second reflected probe signal in response to reflection of the second probe signal by the tracking target;
    based on at least one of the first set of signal instances or the second set of signal instances, determining a target range between the radar receiver and the tracking target;
    corresponding the first set of signal instances to the set of physical receiver elements;
    corresponding the second set of signal instances to a first set of virtual receiver elements; wherein the virtual elements of the first set are displaced from the set of physical receiver elements according to an element translation function; and
    based on the target range, the first set of signal instances, and second set of signal instances, determining a position of the tracking target relative to the radar receiver.

2. The method of claim 1, wherein receiving the first set of signal instances and receiving the second set of signal instances is performed at a single physical receiver element of the set of physical receiver elements.

3. The method of claim 2, wherein transmitting the first probe signal is performed at a first transmitter element of the radar transmitter, wherein transmitting the second probe signal is performed at a second transmitter element of the radar transmitter, the second transmitter element spatially separated from the first transmitter element.

4. The method of claim 1, wherein:
    the radar transmitter and the radar receiver cooperatively define a radar array; and
    the radar array comprises a first plurality of radar elements positioned along a first radar axis.

5. The method of claim 4, wherein:
    the tracking target and radar array cooperatively define a target vector from the radar array to the tracking target; and
    determining the position comprises calculating a first target angle between a first reference vector and a first projected target vector, wherein the first projected target vector is the target vector projected into a first reference plane, the first reference plane containing both of the first radar axis and the first reference vector.

6. The method of claim 4, wherein the radar array further comprises an additional radar element positioned substantially off the first radar axis.

7. The method of claim 6, wherein:
    the tracking target and radar array cooperatively define a target vector from the radar array to the tracking target;
    the additional radar element is positioned along a second radar axis orthogonal to the first radar axis; and
    determining the position comprises:
        calculating a first target angle between a first reference vector and a first projected target vector, wherein the first projected target vector is the target vector projected into a first reference plane, the first reference plane containing both of the first radar axis and the first reference vector; and
        calculating a second target angle between a second reference vector and a second projected target vector, wherein the second projected target vector is the target vector projected into a second reference plane, the second reference plane containing both of the second radar axis and the second reference vector.

8. The method of claim 1, wherein:
    the radar transmitter comprises a first transmitter element and a second transmitter element spatially separated from the first transmitter element; and
    transmitting the first probe signal and transmitting the second probe signal is performed cooperatively by the first transmitter element and the second transmitter element.

9. The method of claim 8, wherein:
    the first probe signal is transmitted beginning at a first time;
    the second probe signal is transmitted beginning at a second time; and
    a difference between the first phase function, referenced to the first time, and the second phase function, referenced to the second time, varies with time.

10. The method of claim 1, further comprising:
    based on interpolation of the first and second sets of signal instances, generating a third set of signal instances; and
    corresponding the third set of signal instances to a second set of virtual elements of the radar array, wherein determining the position is performed based further on the third set of signal instances.

11. The method of claim 10, further comprising:
    transmitting a third probe signal beginning at a third time, the third probe signal having a third phase function different from the first phase function and different from the second phase function;
    receiving a fourth set of signal instances corresponding to a third reflected probe signal at the set of receiver elements in response to reflection of the third probe signal by the tracking target; and
    corresponding the fourth set of signal instances to a third set of virtual receiver elements; wherein the virtual elements of the third set are described in terms of the physical elements of the radar array by a second element translation function different from the element translation function; wherein determining the position of the tracking target is based further on the third set of signal instances.

12. The method of claim 11, further comprising, after transmitting the first, second, and third probe signals, updating the tracking target position determination, comprising:
    transmitting a fourth probe signal and a fifth probe signal;
    receiving a fifth set of signal instances corresponding to a fourth reflected probe signal at the set of receiver elements in response to reflection of the fourth probe signal by the tracking target;
    receiving a sixth set of signal instances corresponding to a fifth reflected probe signal at the set of receiver elements in response to reflection of the fifth probe signal by the tracking target;
corresponding the fifth set of signal instances to the set of physical receiver elements;
corresponding the sixth set of signal instances to the first set of virtual receiver elements; and
based on the fifth and sixth sets of signal instances, determining an updated position of the tracking target relative to the radar receiver.

13. A system for virtual aperture array radar tracking, comprising:
a transmitter configured to transmit a first probe signal and a second probe signal, the first probe signal having a first phase function and the second probe signal having a second phase function different from the first phase function;
a receiver array, comprising a set of physical receiver elements, the set comprising a first plurality of physical receiver elements positioned along a first radar axis, wherein the receiver array is configured to receive a first set of signal instances in response to reflection of the first probe signal by a tracking target, and to receive a second set of signal instances in response to reflection of the second probe signal by the tracking target, wherein the tracking target and radar array cooperatively define a target vector from the radar array to the tracking target; and
a signal processor configured to:
correspond the first set of signal instances to the set of physical receiver elements;
correspond the second set of signal instances to a first set of virtual receiver elements, wherein each virtual receiver element of the first set is spatially translated from a corresponding physical receiver element of the set based on an element translation function; and
based on the first set and second sets of signal instances, determine a position of the tracking target relative to the radar array.

14. The system of claim 13, wherein:
the first plurality of physical receiver elements comprises a first receiver element and a second receiver element; and
the radar array further comprises a third receiver element, wherein the first and third receiver elements are positioned along a second radar axis orthogonal to the first radar axis.

15. The system of claim 14, wherein the set of physical receiver elements further comprises the third receiver element.

16. The method of claim 14, wherein the first set of virtual receiver elements comprises the third receiver element.

17. The method of claim 16, wherein:
the transmitter comprises a first transmit element and a second transmit element spatially displaced from the first transmit element by a displacement vector; and
the third receiver element is spatially displaced from a physical receiver element of the set by the displacement vector.

18. The method of claim 17, wherein the displacement vector is parallel to either the first radar axis or the second radar axis.

19. The method of claim 13, wherein:
the first plurality of physical receiver elements comprises a first receiver element and a second receiver element; and
the set of physical receiver elements further comprises a third receiver element, wherein the third receiver element is spatially displaced from a physical receiver element of the set by a displacement vector, wherein the displacement vector is oriented substantially at a 45° angle from the first radar axis.

20. The method of claim 19, wherein:
the first receiver element is separated from the second receiver element by a minimum spacing d along the first array axis; and
the displacement vector has a magnitude substantially equal to $d\sqrt{2}$.

* * * * *